United States Patent [19]
Morse

[11] Patent Number: 4,703,749
[45] Date of Patent: Nov. 3, 1987

[54] SOLAR APPARATUS
[76] Inventor: Roger N. Morse, 464 Kooyong Road, Caulfield, Victoria, Australia
[21] Appl. No.: 894,394
[22] Filed: Aug. 12, 1986

Related U.S. Application Data

[63] Continuation of Ser. No. 700,333, Feb. 12, 1985, abandoned, which is a continuation of Ser. No. 536,510, Sep. 28, 1983, abandoned.

[30] Foreign Application Priority Data

Sep. 30, 1982 [AU] Australia .................... PF6141

[51] Int. Cl.$^4$ .................................... F24J 2/00
[52] U.S. Cl. ........................... 126/436; 126/400; 126/428; 126/452
[58] Field of Search ............... 126/430, 428, 432, 442, 126/443, 444, 400, 437, 436, 452, 435; 165/104.11

[56] References Cited
U.S. PATENT DOCUMENTS

| | | | |
|---|---|---|---|
| 3,812,903 | 5/1974 | Thomason | 126/400 |
| 3,919,998 | 11/1975 | Parker | 126/435 |
| 3,960,136 | 6/1976 | Moan et al. | 126/443 |
| 3,980,130 | 9/1976 | Thomason et al. | 126/400 |
| 3,993,041 | 11/1976 | Diggs | 126/435 |
| 4,037,583 | 7/1977 | Bakun | 126/430 |
| 4,051,891 | 10/1977 | Harrison | 165/DIG. 4 |
| 4,054,124 | 10/1977 | Knoos | 126/435 |
| 4,076,025 | 2/1978 | Parker | 126/435 |
| 4,081,024 | 3/1978 | Rush et al. | 126/436 |
| 4,133,298 | 1/1979 | Hayama | 126/443 |
| 4,137,898 | 2/1979 | Koizumi et al. | 126/400 |
| 4,139,321 | 2/1979 | Werner | 126/400 |
| 4,173,304 | 11/1979 | Johnson | 126/400 |
| 4,186,725 | 2/1980 | Schwartz | 126/443 |
| 4,187,831 | 2/1980 | Eubank | 126/435 |
| 4,196,719 | 4/1980 | Skriuseth | 126/400 |
| 4,222,365 | 9/1980 | Thomson | 126/436 |
| 4,231,353 | 11/1980 | Kanatani et al. | 120/443 |
| 4,244,519 | 1/1981 | Zornig et al. | 126/400 |
| 4,270,600 | 6/1981 | Bourden | 126/435 |
| 4,279,242 | 7/1981 | Bogatzki | 126/443 |
| 4,284,066 | 8/1981 | Brow | 126/435 |
| 4,286,575 | 9/1981 | Gates | 126/430 |
| 4,289,117 | 9/1981 | Butcher | 126/435 |
| 4,291,680 | 9/1981 | White | 126/443 |
| 4,291,833 | 9/1981 | Franchina | 126/400 |
| 4,303,058 | 12/1981 | Chum | 126/436 |
| 4,346,694 | 8/1982 | Moan | 126/443 |
| 4,421,099 | 12/1983 | Van der Aa | 126/443 |
| 4,434,785 | 3/1984 | Knudsen | 126/400 |
| 4,444,249 | 4/1984 | Cady | 165/104.11 |
| 4,515,149 | 5/1985 | Sgroi et al. | 126/443 |
| 4,526,225 | 7/1985 | Stanton | 126/400 |
| 4,535,755 | 8/1985 | Roberts | 126/443 |

FOREIGN PATENT DOCUMENTS 0095544 6/1982 Japan .................... 126/443

OTHER PUBLICATIONS

"The Performance of Solar Air Heater and Rockpile Thermal Storage System", Choda et al., 1970 Int'l. Solar Energy Society Conference (Australia, 1970).

Primary Examiner—Samuel Scott
Assistant Examiner—H. A. Odar
Attorney, Agent, or Firm—Schwartz, Jeffery, Schwaab, Mack, Blumenthal & Evans

[57] ABSTRACT

An improved solar apparatus for heating above 100° C. is disclosed. Said apparatus comprises a solar collector means for heating a heat transferring gas, ducting means extending from said solar collector means for permitting moving of said gas past a heat storage medium whereby heat in said gas will be transferred to said heat storage medium by directly contacting said heat storage medium, flow control means provided in said ducting whereby to permit said gas to flow to said heat storage medium when said solar collector means is radiated by the sun, and to permit said gas to pass through said heat storage medium for recovery of heat therefrom when said solar collector means is not radiated by the sun. The solar collecting means includes a plurality of collectors, each collector comprising two elongate concentric tubes connected together at each end to provide an annular space therebetween, said annular space being evacuated and wherein the outer surface of the inner tube has a selective surface to enhance solar energy absorption, said inner tube providing a passageway for said gas to be heated by said collector, and wherein said plurality of collectors are interconnected with others at their ends and to said ducting means so that said gas can pass therethrough and be heated and then passed into said ducting means at a temperature in excess of 100° C.

18 Claims, 5 Drawing Figures

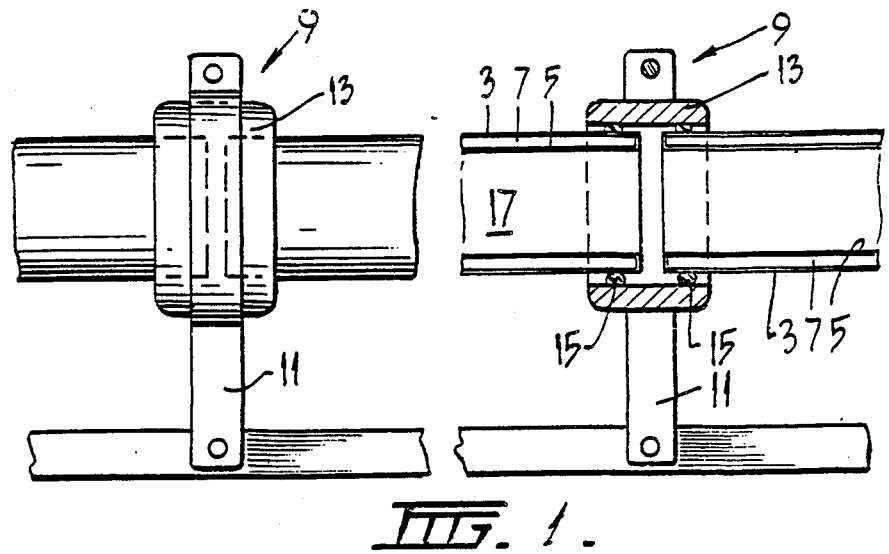
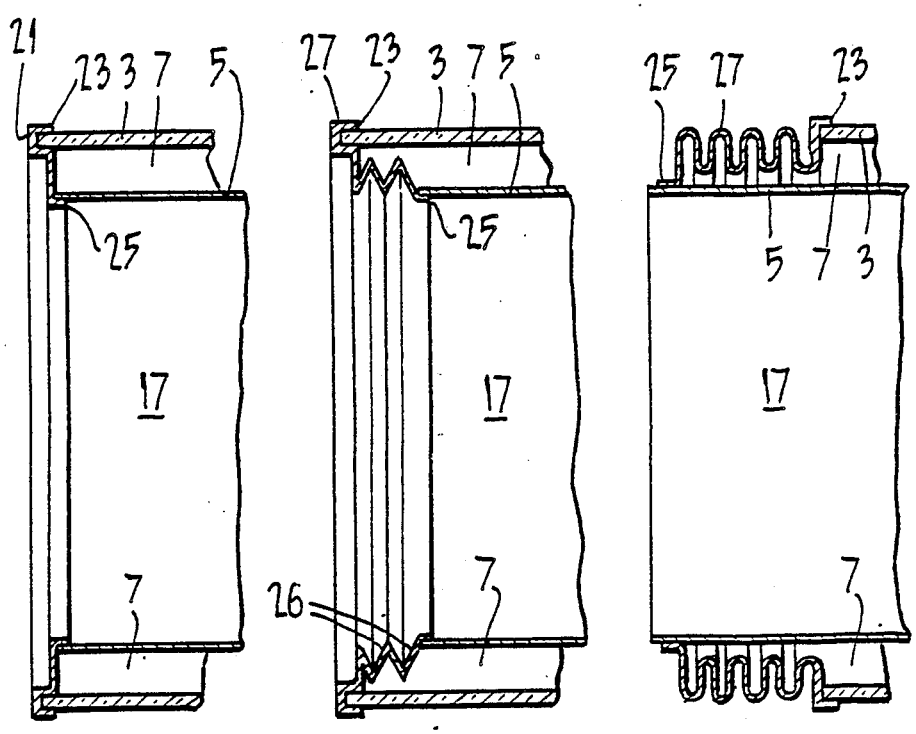

SOLAR APPARATUS

This is a continuation of application Ser. No. 700,333, filed Feb. 12, 1985, which was abandoned upon the filing hereof, which is a continuation of Ser. No. 536,510 filed Sept. 28, 1983 now abandoned.

BACKGROUND OF THE INVENTION

1. Field of the Invention

This invention relates to solar apparatus and relates particularly but not exclusively to such for providing heat at 100° C. or higher.

2. Description of Prior Art

Hitherto steam has been generated by solar means by directly heating water in a solar collector. However with such heating it is not economically feasible to store the steam for subsequent use. The present invention attempts to provide solar apparatus where a gas such as air is heated to above 100° C. and in one embodiment then used to convert water to steam and whereby energy from the solar collectors therein can be stored in a suitable store and then transferred from that store to provide steam at a subsequent time as for example when the collectors are unable to be radiated by the sun.

STATEMENT OF THE INVENTION

It is an object of the invention to provide an improved solar apparatus which will provide heat at 100° C. or above.

Therefore in accordance with a broad aspect of the present invention there may be provided an improved solar apparatus for heating above 100° C., said apparatus comprising a solar collector means for heating a heat transferring gas, ducting means extending from said solar collector means for permitting moving of said gas past a heat storage medium whereby heat in said gas will be transferred to said heat storage medium by directly contacting said heat storage medium, flow control means provided in said ducting whereby to permit said gas to flow to said heat storage medium when said solar collector means is radiated by the sun, and to permit said gas to pass through said heat storage medium for recovery of heat therefrom when said solar collector means is not radiated by the sun.

It is also preferred that said solar collecting means includes a plurality of collectors, each collector comprising two elongate concentric tubes connected together at each end to provide an annular space therebetween, said annular space being evacuated and wherein the outer surface of the inner tube has a selective surface to enhance solar energy absorption, said inner tube providing a passageway for said gas to be heated by said collector, and wherein said plurality of collectors are interconnected with others at their ends and to said ducting means so that said gas can pass therethrough and be heated and then passed into said ducting means at a temperature in excess of 100° C.

It is particularly preferred that said storage medium comprises a packed bed of particulate material such as rock.

It is also particularly preferred that there be provided auxiliary air heating means for heating said gas from an auxiliary source so that the air heated thereby can be passed to said heat exchanger whereby to generate steam by said auxiliary heating source when said storage medium is unable to provide sufficient heat.

Most preferably each end of the collector tube is mounted within an annular connector support member of thermally insulating material. It is particularly preferred that the connector support be for connecting other similar collectors end to end to provide a series air path through the inner tubes.

It is particularly preferred that the gas which is heated be air although other gases which have desired heat transference properties may be used.

BRIEF DESCRIPTION OF DRAWINGS

In order that the invention can be more clearly ascertained preferred embodiments for generating steam will now be described with reference to the accompanying drawings wherein:

FIG. 1 is a side view of a preferred solar collector and of a preferred connector support means used for connecting a plurality of such solar collectors in series; , FIG. 2 is an enlarged vertical section of one end of a seal at one of the tubes shown in FIG. 1;

FIG. 3 is an enlarged vertical section of a further embodiment of seal at one end of the tubes shown in FIG. 1;

FIG. 4 is an enlarged vertical section of a further embodiment of seal at one end of the tubes shown in FIG. 1.

DESCRIPTION OF PREFERRED EMBODIMENT

Figure 5:
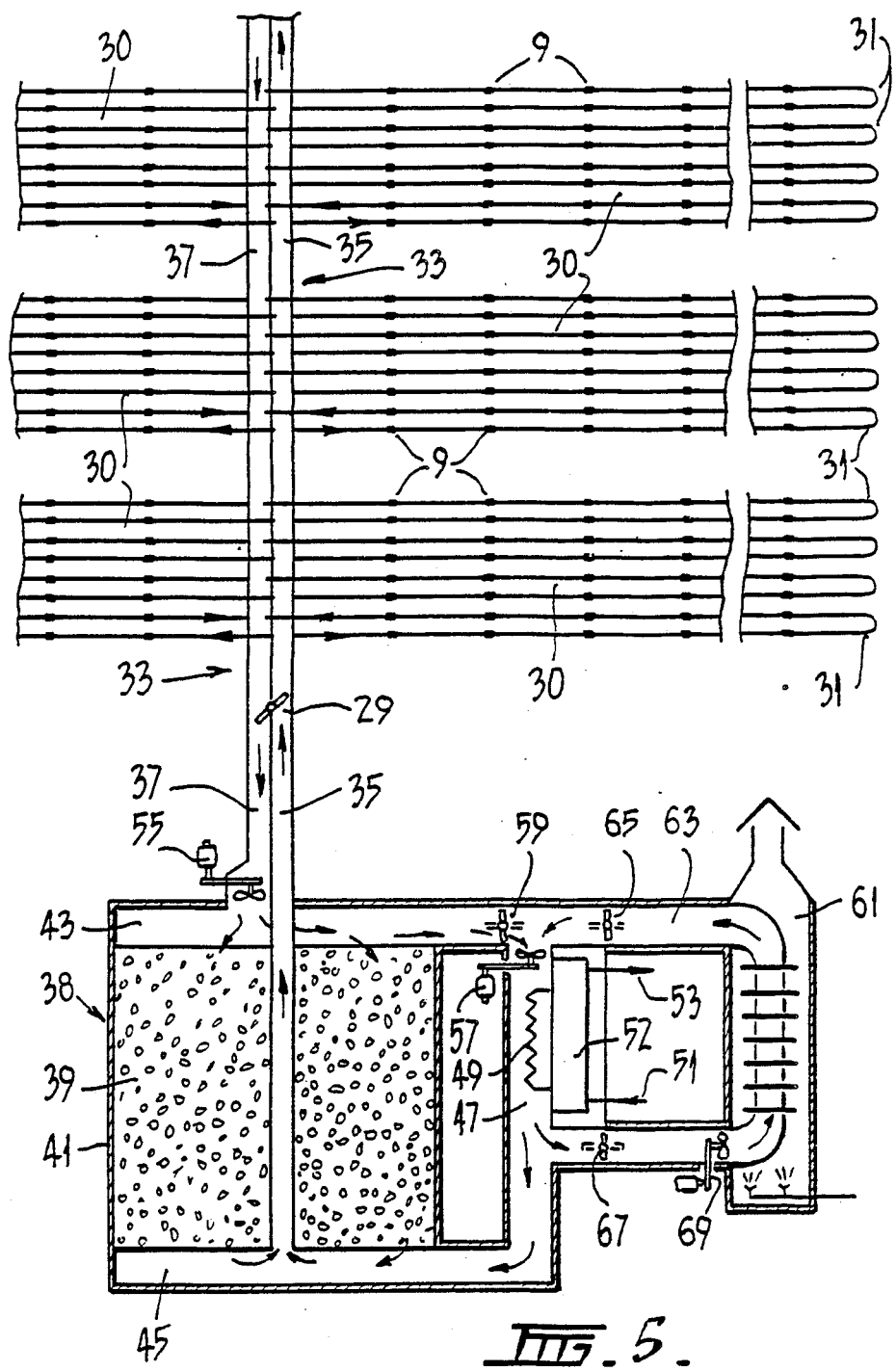
FIG. 5 is a schematic diagram of a typical solar apparatus made in accordance with the present invention.

Referring firstly to FIG. 1 there is shown a solar collector 1 comprising a pair of elongate tubes 3 and 5 mounted one within the other. The outer tube 3 is of glass and the inner tube 5 of metal. The tubes 3 and 5 are mounted coaxially so that an annular space 7 is provided therebetween. The annular space is evacuated of air and each end of the collector 1 is sealed, thereby providing a sealed evacuated annular space 7. The outer surface of the inner tube 5 is coated with a selective absorbing surface such as nickel-black which may be deposited by one of the known conversion coating processes for solar collectors. A typical method is disclosed in Solar Energy Materials 5 (1981) 317—355–North Holland Publishing Co.—by K. J. Cathro—Formation of Nickel-Black Selective Surfaces by A Conversion Coating Process. The glass used for the outer tube 3 is selected to have a high solar transmittance and may be coated with one of the known anti-reflecting coatings to further improve the solar transmittance. The collector 1 is constructed to ensure that thermal stresses caused by any temperature differentials between the inner and outer tubes 3 and 5 do not result in rupture of a tube. A typical length of the solar collector 1 is 1500 mm long with the tube 3 having an external diameter of 95 mm, and with the tube 5 a diameter of 75 mm.

Solar collectors 1 are arranged to be mounted end to end in a return loop by means of connector supports shown generally by numeral 9. Each connector support 9 comprises a bracket member 11 which carries a thermally insulating annulus 13. The thermally insulating annulus 13 is clamped to the bracket member 11 by the bracket member 11 having a clamping upper portion. A suitable clamping screw or nut engages at the top of the bracket member 11 whereby to cause clamping engagement of the upper portion with the annulus 13. It can be seen by inspecting FIG. 1 that O-ring seal means 15 are provided in the thermally insulating annulus 13 to engage with the inner surface thereof and with the outer surface of the outer tube 3. Accordingly, with the structure shown an air tight passageway 17 is provided from one collector 1 to another collector 1.

In use a plurality of such collectors 1 are connected end to end to provide a series passageway 17. Such is preferably in the form of a return loop—see FIG. 5. The return loop is formed by inserting a return bend member at the end of a collector 1. The return bend member can be of the same general construction as that of the annulus 13, but having a "U" bend passageway therethrough.

If tubes 1 require maintenance then it is a relatively simple matter to release the collector supports 9 at each end of a particular collector 1 and to axially slide the thermally insulating annulus 13 along the tubes whereby to permit one of the tubes to be removed. Replacement of tubes can be effected by reversing the above procedure.

The bracket members 11 are typically fastened to a suitable support means such as a roof of a building. Desirably the tubes are orientated north and south whereby to be irradiated for the maximum possible heat generation.

Referring now to FIG. 2, a particularly preferred arrangement of the components of the collector 1 uses 0.3 to 0.5 mm thick galvanized steel for the inner tube 5 and thin steel end caps 21 to seal the two ends of the annulus between the tubes 3 and 5. The end caps 21 are sealed to the outer tube 3 with a known epoxy resin 23 suitable for vacuum systems and is attached to the inner tube 5 using a high temperature solder 25 or other suitable sealant such as epoxy resin.

With this arrangement, atmospheric pressure tends to hold the end caps 21 in position. In the case of collectors, which operate at moderate temperatures, the end seals may be prestressed to put tube 5 in tension initially, but for high temperature collectors a bellows seal 27 as shown in FIGS. 3 or 4 may be used on one or both ends of the collector.

In the embodiment of FIG. 3 the bellows seal 27 is fitted within the ends of the collector 1. In this embodiment the inner tube 5 is of shorter length than the outer tube 3. Here the bellows seal 27 is made of sheet metal, preferably of the same material from which the inner tube 5 is made. The bellows seal 27 is made with a plurality of folds 26. The bellows seal is fastened to the tubes 3 and 5 in the same manner as described previously. The bellows allows for the maintaining of a seal between tubes 3 and 5 having regard to the different expansion rates between the inner and outer tubes 3 and 5. The expansion may vary because of flexing temperature differentials and differing co-efficiency of expansion. Thus, the inner tubes usually expand axially more than the outer tube 3 and such bellows allows for this. In the embodiment of FIG. 4 the inner tube 5 is longer than the outer tube 3 and the bellows 27 is fitted over the inner tube 5 in the manner shown. The fastening of this bellows seal 27 is identical to that in the previous embodiments. Combinations of seals 21 or 27 as shown in the various embodiments may be incorporated in a collector 1 if desired.

The absorptance and emittance of the selective absorbing surface on outer surface of tube 5 will vary with the immersion time in the conversion coating solution. A preferred combination is, absorptance 0.87, emittance 0.07.

Referring now to the embodiment shown in FIG. 5 a typical combined solar collector and a solar energy heat storing means and a steam generating means are shown. Here an array of loops L of solar collectors 1 are provided on a roof area or other like area which is subjected to incidence by the sun. It can be seen that the array has a plurality of groups 30 of collector loops L. It can also be seen that the loops L are connected in parallel. It can be seen that each of the groups 30 are interconnected with main ducting 33. The main ducting 33 has an inlet duct passage 35 and an outlet duct passage 37. Accordingly the parallel connected collector arrays 30 are interconnected so that each loop L has one end connected with the inlet duct 35 and the other end with the outlet duct 37. It can also be seen that a similar pattern of collector groups 30 is provided on the opposite side of the ducting 35 to the first mentioned group 30. The ducting 33 is typically insulated on the external surfaces. The dividing partition between the inlet and outlet ducts 35 and 37 may be insulated if desired but because the temperature differential therebetween is small it may be uninsulated.

The ducting 33 extends to a heat storage means 38 which comprises a tank filled with a particulate mass 39. Typically the particulate mass is crushed rock screenings of uniform screening size. A preferred size is 20 mm screenings. It is observed that the inlet duct 35 extends downwardly through the centre of the particulate mass 39. Conveniently the particulate mass 39 is stored in a cylindrical container 41 as shown. It can be observed that the cylindrical container 41 has an upper ducting passageway 43 and a lower ducting passageway 45. The ducting passageway 43 interconnects with the lower ducting passageway 45 externally of the cylindrical casing 41 through ducting 47. A heat exchanger 49 is situated within the ducting 47 and enables a transfer of heat from a gas such as air which is passed through the ducting 47 to heat water which is circulated through the heat exchanger 49 from the cylinder 52. The feed water is introduced through an inlet passage 51. This, in turn, causes steam to be generated which can be delivered from the outlet passage 53.

It can be seen that a fan means 55 is provided in the outlet duct 33. A similar fan 57 is provided in the ducting 47. Both the fans 55 and 57 are selectively operated in order to cause the gas to flow in the various ductings in the required directions. A damper 59 is provided in the upper ducting passageway 43 so that when the particulate mass 39 is to be heated then the gas is caused to flow in a direction along the inlet duct 35 where it can then pass into the loops L and through each of the collectors 1 therein. The gas then passes from loops L into the outlet duct 37, past the fan 55 which is operating to assist the air flow, and down through the top of the particulate mass 39. The particulate mass 39 is then heated by that gas. During such operation the damper 59 may be either open or closed depending on the temperature of the gas in duct 43 and whether or not steam is required. Heated gas from the collector array may flow through the particulate mass 39, or through the heat exchanger 49 or through both. Gas flowing from the collectors through the particulate mass 39 stores heat for future use and gas flowing through the heat exchanger transfers heat to the heat exchanger 49 and produces steam.

When the top of the particulate mass 39 is heated to a required temperature, typically in excess of 120 degrees Celsius, then damper 59 can be opened and fan 57 operated, which may cause gas to circulate upwards through the particulate mass 39 to then pass through the duct 47 to cause the heat from the particulate mass 39 to be transferred back to the air which, in turn, transfers the heat therefrom to the heat exchanger 49. In ducts 35. and 37 a damper 29 is provided which closes when fan 55 is not operating, thus preventing loss of heat from the particulate mass 39.

It can be seen from FIG. 5 that an auxiliary heating means 61 is provided for heating gas such as air and this is interconnected via duct work 63. Further dampers 65 and 67 are provided as well as a further fan 69 so that when the heat from the particulate mass 39 is reduced below a required temperature then supplemental heat can be provided to the gas. The dampers 65 and 67 and 59 are then appropriately operated to cause gas to flow in the required direction to provide heat to the heat exchanger 49.

The groups 30 of loops L have up to sixteen or more collectors 1 in each loop L and there may be a multiplicity of groups 30 which are connected in parallel to the duct 33. The collectors 1 are typically spaced 35 mm apart (i.e. at 143 mm centres) and have a 300 mm access way between the groups 30 to permit assembly and/or maintenance. Each of the groups 30 is mounted at 1,410 mm centres. Accordingly each group has 10.5 square meters of collector absorber area and occupies 23 square meters of roof area. The top, bottom and sides of the container 41 are insulated. Air is used as the transfer gas because it is inexpensive but other suitable gases are not excluded.

Using known technology the air flow, pressure drop and particle size can be appropriately proportioned so that when hot gas is drawn off from the particulate mass 39 the gas will be heated to substantially the same temperature as the gas used to heat the particulate mass 39. The heat storage means 38 is therefore a combined heat exchanger and storage medium whereby heat input and heat output are closely related.

Since solar heat generating systems are capital intensive, a useful measure of their cost effectiveness is the total heat generated annually per dollar of installed cost (assuming at least twenty year life of the system).

However, if systems are to be both cost effective and reliable, some auxiliary supply of energy is needed, usually gas, oil or electric heaters.

A small amount of electric power is needed for controls, fans and pumps.

The overall design objective for the system described is to provide the highest annual heat generation consistent with an annual solar contribution of 60 to 80%, annual parasitic electric energy some 5% of annual solar heat generation, long life and very low maintenance costs. The main components are the collector array, the heat store 38, the heat exchanger 49 and the connecting ducting which should be kept short.

The design procedure is based on the premise that the collector array is mounted on a factory or similar roof in such a way that the maximum number of megajoules of heat energy are generated annually per dollar cost of the array (Annual MJ/$ cost) consistent with effective use of the area as a heat generator.

Air is used as the energy transfer fluid because it is inexpensive and it therefore permits the use of packed bed thermal storage which is cost effective in the range 120–200 degrees Celsius needed for steam generation for use in industrial process heating. Evacuated tubular collectors are used because they offer the best prospect for large scale manufacture in automated factories. The use of evacuated tubular collectors in this way presents many problems because the system must be designed very skillfully to be cost effective.

The critical design parameters of the collector array are the external diameter D, (m) of the inner tube 5 of the collectors 1, the thickness G, (m) of the material from which tube 5 is constituted, the air velocity V, (m/s) through the passageways 7, the mean operating temperature of the system and the length of the tube loops L (m). Other considerations such as the diameter of the outer tube 3 and the spacing of individual tubes from each other to minimize shading, insulation and ambient temperatures are all factors which have to be considered.

The key component in the array is the collector tube and the first decision is to choose the value of D. This is selected by means of a computer aided design process using the following relationships.

Annual Fan Energy (A.F.E.)/Annual Solar Energy Collected (A.S.E.)

$$A.F.E./A.S.E. = 1.64 \times 10^{-3} \, V^3.F.fn/Y.ef \qquad (1)$$

Temperature rise dT (degrees Celsius) between inlet and outlet in a collector loop for peak insulation (assumed to be 1000 w/sqm) is given by:

$$dT = 3.57 \times 10^{-6} L.D.I.T./V(D+2G)^2 \qquad (2)$$

where:
F = Reynolds friction factor, dependent on roughness and flow conditions (0.024–0.026)
fn = number of hours/yr fan operation (3200)
Y = annual solar heat generation, MJ/sqm,yr (2447)
N = annual collection efficiency ratio (0.35)
ef = fan efficiency ratio (0.6)
I = Peak Heat Generation W/sq.M.
T = operating temperature, degrees Kelvin (403) (deg K = deg C + 273)
G = tube thickness (0.001M)

Typical values used for design are shown in brackets. It should be appreciated that a computer can be utilized in the design of a total installation whereby to optimize the fast calculation of the variables when certain of the variables are initially chosen i.e. diameter of the collector tube. A is calculated as follows:

$$A = 4.62 \times 10^6 V(D-2G)/13.5$$

The Reynolds friction factor F is obtained from the value of A by reference to a known chart published for example in Eshbash Handbook of Engineering fundamentals 2nd Edition 1952 Section 8-35 published by John Wiley & Sons.

P is the pressure drop in mm of water in a loop at 293 K.
Q is the pressure drop in mm of water at the working temperature deg K (481 in the example).
M is the annual fan energy A.F.E.
B is dT in equation (2).
W is annual solar energy collected A.S.E.
M/W = A.F.E./A.S.E.

In order to choose a tube diameter and length which will lead to the most cost effective system, it is important to note that the collector cost is typically about half the total cost, so it is necessary to reduce as far as possible costs due to the number of connections and the length of ducting. This leads to the loop length, L, being as high as possible, which from Equation (2) means that D must be high also, as must be the individual tube length.

The influence of tube diameter on maximum loop length, for a particular design, when all other parameters are unchanged, is shown in the following Table:

| dT degrees K | Fan energy ratio | V m/s | D mm | L m |
|---|---|---|---|---|
| 50 | 0.04 | 9 | 29 | 15 |
| " | " | " | 86 | 48 |
| " | " | " | 150 | 84 |

The connector 1 supports 9 incorporate an annulus 13 whose purpose is to reduce the collector 1 end losses to the point where the loss coefficient does not exceed 2.0 w/m2 degrees Celsius based on the absorber area. This leads to a sleeve design for which the loss does not exceed $0.057(T-T_a)-615\ A_a$ where $T_a$ is the ambient temperature, K, and $A_s$ is the total projected area, sq/m, of any absorber coating which is shaded by the insulation i.e. for the example given, its length ×0.086. This formula depends on the tube diameter and its thermal properties.

The choice of 86 mm for tube internal diameter is about the largest which can be physically handled conveniently, as is the length of 2000 mm.

If tubes of a different diameter are used the Equations (1) and (2) and the computer program can be used to determine L, dT, V and A.F.E./A.S.E. for a particular installation, in order to maximise the value of Annual MJ/$ cost.

It will also be observed that, for the example shown in FIG. 5, the loop length L could be increased to 45 to 50 m without the value of dT becoming excessive.

Insulation for the store 38 and other parts of the system, is designed on the basis that the energy saved annually per dollar cost, must at least equal the energy that could be generated by the same investment in collectors.

The heat exchanger 49 is designed to operate on a low temperature difference between air and steam. This as previously noted could be expected to be around 25° K. If this figure is too high the cost effectiveness of the collector is reduced but if it is too low the steam generator is penalized. The choice is influenced by the steam pressure, the collector and the steam generator's cost and thermal characteristics. The optimum solution is that which gives the highest value of annual MJ/$ cost of the whole system.

A feature of the system is its inherent inbuilt safety feature which follows if all steam pressurised sections are constructed to withstand the pressure which the system can reach, under continuous operation in the solar climate where it is installed, without any load being drawn from it. This stagnation condition can be predicted by calculation and checked by test after installation.

It is possible to operate the system described above completely by a micro-processor control system. This micro-processor system could include a program to compare predicted and actual performance characteristics and indicate where adjustments are required or where faults need attention. The control for the various fans and dampers of the system may be a simple differential control.

It should be appreciated that instead of using a heat exchanger 49 as disclosed in the above embodiment, the ducting may pass the air to any object which requires to be heated to 100° C. or higher. Desirably the object is the heat exchanger 49 such enables the spent air to be returned through the ducting.

Modifications may be made to the invention as would be apparent to persons skilled in the solar energy arts. These and other modifications may be made without departing from the ambit of the invention, the nature of which is to be determined from the foregoing description.

I claim:

1. A solar steam generating apparatus for generating process steam in the temperature range of 100° C. to 200° C., said apparatus comprising:
    (a) a solar collector comprised of a plurality of tubular collectors from each of which air has been evacuated, each tubular collector comprising two elongated and concentric tubes connected together at each end to provide an evacuated annular space therebetween, the outer surface of the inner tube having a nickel black selective surface to enhance solar energy absorption, said inner tube providing a passageway for air to be heated by said tubular collector, a plurality of evacuated tubular collectors being serially interconnected at their adjacent ends so that said air can pass serially therethrough and be solar heated to a temperature in the range of 100° C. to 200° C., said evacuated tubular collectors being connected to form at least one return loop;
    (b) heat storage means, and first duct means communicating with said solar collector and with said heat storage means to permit the transfer of heat from said air heated by said solar collector to said heat storage means;
    (c) a steam generating heat exchanger, and water and steam lines directed to and from said heat exchanger;
    (d) second duct means communicating with said first duct means, said heat exchanger being mounted in said second duct means,
    (e) fan means associated with said first and second duct means for circulating air through said solar collector and said first and second duct means;
    (f) flow control means provided in said first and second duct means to selectively control the flow of air to and from said solar collector, said heat exchanger, and said heat storage means, the selective passage of heated air from said solar collector to said heat storage means transferring heat to the latter and the selective passage of heated air at the designated temperature over said heat exchanger and through said second duct means serving to generate steam in said heat exchanger, said flow control means permitting air passing through said second duct means over said heat exchanger to bypass said solar collector and pass from said second duct means upwardly through said heat storage means and back to said second duct means, thereby effecting steam generation from stored heat during periods when sun radiation on the solar collector is insufficient for steam generation, and wherein
    (g) said air passing through said solar collector, said first and second duct means and said heat storage means is at substantially atmospheric pressure during operation of the apparatus, whereby said apparatus provides 60-80% of the annual energy required for steam generation by said heat exchanger.

2. Solar steam generating apparatus as recited in claim 1, wherein the outer tube of each collector is of glass, and wherein bellows means is provided at least at one end of each collector between the inner and outer tubes whereby to maintain an air tight seal between the inner and outer tubes by allowing for differences in expansion between the inner and outer tubes as they extend axially.

3. Solar steam generating apparatus as recited in claim 1, wherein the tubular collectors are interconnected in serial form by an annular connector support member, said support member providing a seal between the collectors so as to permit a series air heat transferring path through the inner tubes in each collector.

4. Solar steam generating apparatus as recited in claim 1, wherein said solar collector comprises a plurality of parallel connected loops of serially connected collectors.

5. Solar steam generating apparatus as recited in claim 1, wherein said heat storage means comprises a bed of particulate material.

6. Solar steam generating apparatus as recited in claim 5, wherein air is delivered to the top of said particulate material in the heat storage means so that it can pass therethrough from the top to the bottom during heating of said storage medium, with the air travelling in the opposite direction when heat is taken from said storage medium.

7. Solar steam generating apparatus as recited in claim 6, further including auxiliary heating means mounted in an auxiliary duct means in flow communication with said second duct means, whereby heat energy can be supplied from said auxiliary heating means to air passing through said auxiliary duct means when there is insufficient heat provided by said solar collector or said heat storage means.

8. Solar steam generating apparatus as recited in claim 2, wherein said bellows means does not significantly protrude radially inwardly of the inner tube so as to provide a substantially non-resistive surface to the flow of air therethrough.

9. Solar steam generating apparatus as recited in claim 8 wherein the outer tube of each collector is of glass and said inner tube is of metal.

10. Solar steam generating apparatus as recited in claim 9 wherein one end of said outer tube extends longitudinally outwardly past the end of said inner tube at the same end of the collector as said outer tube.

11. A solar steam generating apparatus for generating process steam in the temperature range of 100° C. to 200° C., said apparatus comprising:
(a) a solar collector comprised of a plurality of tubular collectors from each of which a heat exchange gas has been evacuated, each tubular collector comprising two elongated and concentric tubes connected together at each end to provide an evacuated annular space therebetween, the outer surface of the inner tube having a selective surface to enhance solar energy absorption, said inner tube providing a passageway for gas to be heated by said tubular collector, a plurality of evacuated tubular collectors being serially interconnected at their adjacent ends so that said gas can pass serially therethrough and be solar heated to a temperature in the range of 100° C. to 200° C., said evacuated tubular collectors being connected to form at least one return loop;
(b) heat storage means, and first duct means communicating with said solar collector and with said heat storage means to permit the transfer of heat from said gas heated by said solar collector to said heat storage means;
(c) a steam generating heat exchanger, and water and steam lines directed to and from said heat exchanger;
(d) second duct means communicating with said first duct means, said heat exchanger being mounted in said second duct means;
(e) fan means associated with said first and second duct means for circulating gas through said solar collector and said first and second duct means;
(f) flow control means provided in said first and second duct means to selectively control the flow of gas to and from said solar collector, said heat exchanger, and said heat storage means, the selective passage of heated gas from said solar collector to said heat storage means transferring heat to the latter and the selective passage of heated gas at the designated temperature over said heat exchanger and through said second duct means serving to generate steam in said heat exchanger, said flow control means permitting gas passing through said second duct means and over said heat exchanger to bypass said solar collector and pass from said second duct means upwardly through said heat storage means and back to said second duct means, thereby effecting steam generation from stored heat during periods when sun radiation on the solar collectors insufficient for steam generation, and wherein
(g) said gas passing through said solar collector, said first and second duct means and said heat storage means is at substantially atmospheric pressure during operation of the apparatus,
whereby said apparatus provides 60-80% of the annual energy required for steam generation by said heat exchanger.

12. A solar steam generating apparatus for generating process steam in the temperature range of 100° C. to 200° C., said apparatus comprising:
(a) a solar collector comprised of a plurality of tubular collectors from each of which air has been evacuated, each tubular collector comprising two elongated and concentric tubes connected together to provide an evacuated annular space therebetween, the outer surface of the inner tube havng a selective surface to enhance solar energy absorption, said inner tube providing a passageway for air to be heated by said tubular collector, a plurality of evacuated tubular collectors being interconnected so that said air can pass therethrough and be solar heated to a temperature in the range of 100° C. to 200° C.;
(b) heat storage means, and first duct means communicating with said solar collector and with said heat storage means to permit the transfer of heat from said air heated by said solar collector to said heat storage means;
(c) a steam generating heat exchanger, and water and steam lines directed to and from said heat exchanger;

(d) second duct means communicating with said first duct means, said heat exchanger being mounted in said second duct means;

(e) fan means associated with said first and second duct means for circulating air through said solar collector and said first and second duct means;

(f) flow control means provided in said first and second duct means to selectively control the flow of air to and from said solar collector, said heat exchanger, and said heat storage means, the selective passage of heated air from said solar collector to said heat storage means transferring heat to the latter and the selective passage of heated air at the designated temperature over said heat exchanger and through said second duct means serving to generate steam in said heat exchanger, said flow control means permitting air passing through said second duct means and over said heat exchanger to bypass said solar collector and pass from second duct means upwardly through said heat storage means and back to said second duct means, thereby effecting steam generation from stored heat during periods when sun radiation on the solar collector is insufficient for steam generation, and wherein (g) said air passing through said solar collector, said first and second duct means and said heat storage means is at substantially atmospheric pressure during operation of the apparatus.

13. Solar steam generating apparatus as recited in claim 12, wherein said heat storage means comprises a bed of particulate material.

14. Solar steam generating apparatus as recited in claim 13, wherein air is delivered to the top of said particulate material in the heat storage means so that it can pass therethrough from the top to the bottom during heating of said storage medium, with the air travelling in the opposite direction when heat is taken from said storage medium.

15. Solar steam generating apparatus as recited in claim 13, further including auxiliary heating means mounted in an auxiliary duct means in flow communication with said second duct means, whereby heat energy can be supplied from said auxiliary heating means to air passing through said auxiliary duct means when there is insufficient heat provided by said solar collector or said heat storage means.

16. Solar steam generating apparatus as recited in claim 12 wherein the outer tube of each collector is of glass and said inner tube is of metal.

17. Solar steam generating apparatus as recited in claim 16 wherein one end of said outer tube extends longitudinally outwardly past the end of said inner tube at the same end of the collector as said outer tube.

18. A method for generating process steam by the solar heating of air to a temperature of 100° C. to 200° C. at substantially atmospheric pressure, comprising the steps of:

(a) passing air through a plurality of tubular collectors each comprising inner and outer concentric tubes, the annular space between which is evacuated, the inner tube having an outer selective surface to enhance solar energy absorption, with air passing through the inner tube and being heated to a temperature in the range of 100° C. to 200° C.;

(b) providing a heat storage means for storing air solar heated by said collector, and a steam generating heat exchanger through which water is passed for conversion to steam;

(c) selectively passing heated air to either or both of said heat storage means and said heat exchanger depending on the temperature of said heated air, air passing through said heat storage means transferring heat thereto before returning to said tubular collectors, and heated air passing over said heat exchanger transferring heat to said water passing through said heat exchanger for steam generation, and (d) controlling the flow of heated air so as to permit heated air to pass over said heat exchanger, upwardly through said heat storage means and back over said heat exchanger thereby bypassing said tubular collector, the stored heat in said heat storage means being transferred to the recirculated air to generate steam in said heat exchanger.

* * * * *